No. 731,742. PATENTED JUNE 23, 1903.
J. W. BEAUMONT.
WELL LINING.
APPLICATION FILED OCT. 22, 1902.
NO MODEL. 4 SHEETS—SHEET 1.
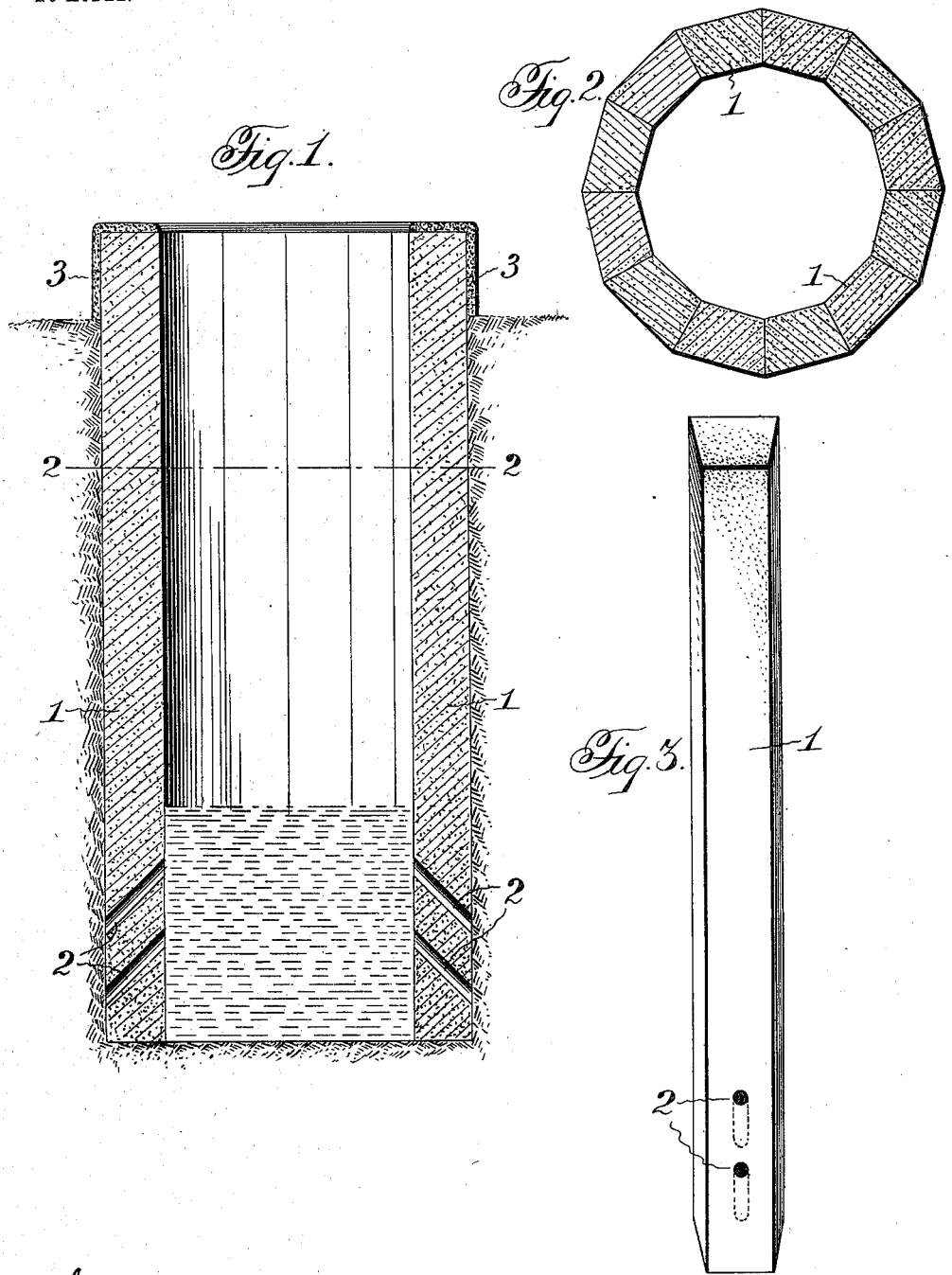
Witnesses:
Jas. E. Hutchinson.
Inventor.
John W. Beaumont,
By James L. Norris, Atty.

No. 731,742. PATENTED JUNE 23, 1903.
J. W. BEAUMONT.
WELL LINING.
APPLICATION FILED OCT. 22, 1902.
NO MODEL. 4 SHEETS—SHEET 2.
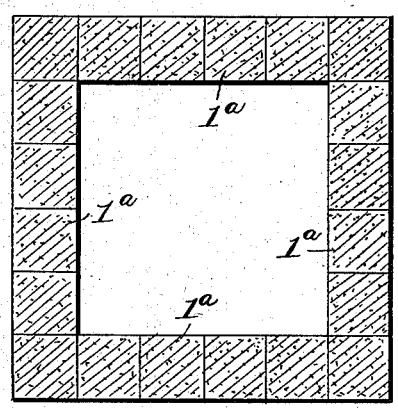
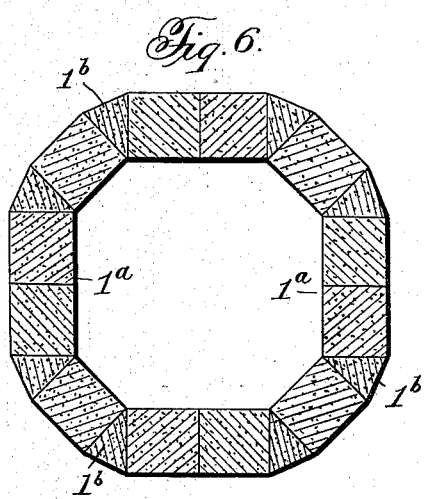
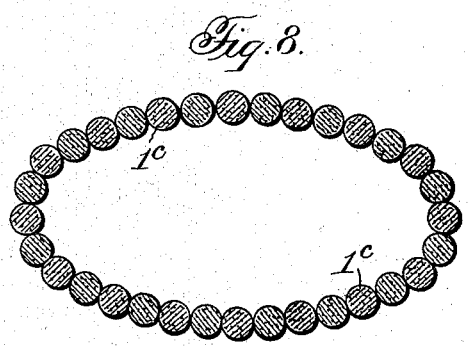
Witnesses:
Jas. E. Hutchinson
Inventor.
John W. Beaumont,
By James L. Norris
Atty.

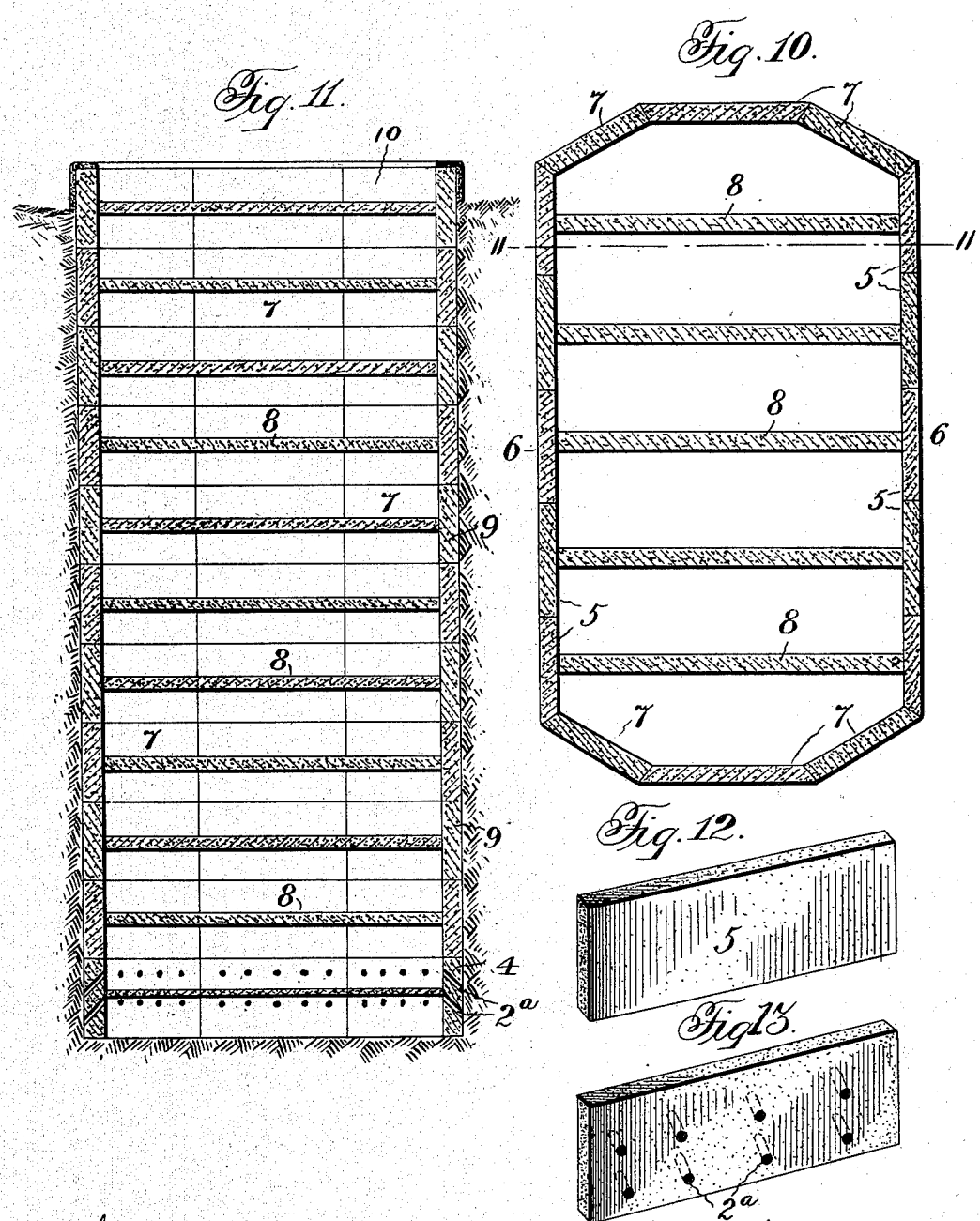

No. 731,742. PATENTED JUNE 23, 1903.
J. W. BEAUMONT.
WELL LINING.
APPLICATION FILED OCT. 22, 1902.
NO MODEL. 4 SHEETS—SHEET 4.
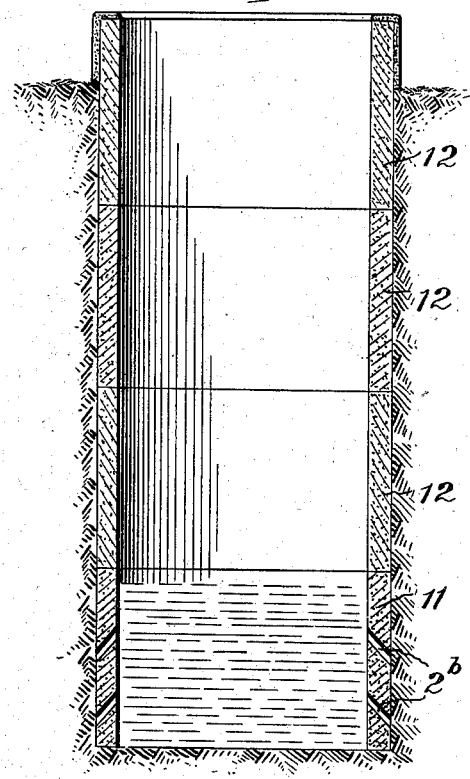
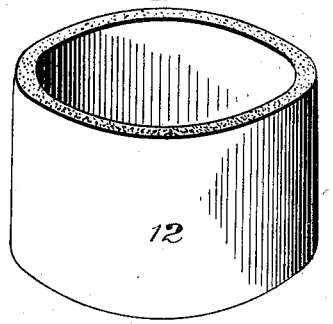
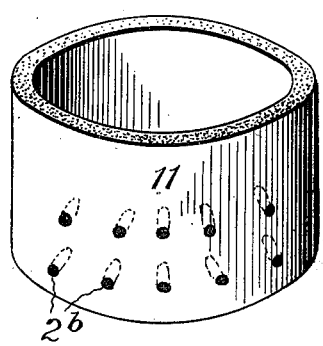
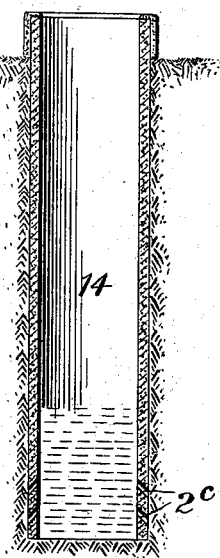
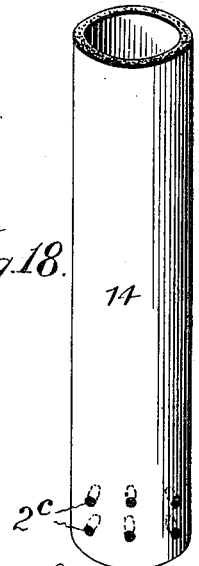
Witnesses:
Jas. E. Hutchinson
Inventor.
John W. Beaumont,
By James L. Norris
atty.

No. 731,742. Patented June 23, 1903.

UNITED STATES PATENT OFFICE.

JOHN W. BEAUMONT, OF LOS ANGELES, CALIFORNIA.

WELL-LINING.

SPECIFICATION forming part of Letters Patent No. 731,742, dated June 23, 1903.

Application filed October 22, 1902. Serial No. 128,316. (No model.)

*To all whom it may concern:*

Be it known that I, JOHN W. BEAUMONT, a citizen of the United States, residing at Los Angeles, in the county of Los Angeles and State of California, have invented new and useful Improvements in Well-Linings, of which the following is a specification.

This invention relates to casings for wells, cisterns, reservoirs, and the like, or which may be sunk in the beds of lakes or running streams of water; and it has for its object to provide a casing of the class described which may be constructed and placed in position at a small cost, which will be practically indestructible, efficient in operation, and which will not become clogged or filled up with sediment.

To these ends my invention consists in the features and in the construction, combination, and arrangement of parts hereinafter described, and particularly pointed out in the claims following the description, reference being had to the accompanying drawings, forming a part of this specification, wherein—

Figure 1 is a vertical sectional view of a well-casing constructed according to one form of my invention, showing the same sunk into the ground. Fig. 2 is a horizontal sectional view taken on the line 2 2 of Fig. 1. Fig. 3 is a detail perspective view of one of the piles. Fig. 4 is a horizontal sectional view of another form of well-casing involving the same principle. Fig. 5 is a detail perspective view of one of the piles employed in constructing the casing shown in Fig. 4. Fig. 6 is a view similar to Fig. 4, illustrating another form of casing involving the same principle. Fig. 7 is a detail perspective view of one of the piles employed in constructing the corners of said casing. Fig. 8 is a view similar to Figs. 4 and 6, illustrating a still further modified form of casing. Fig. 9 is a detail perspective view of one of the piles employed in constructing the casing shown in Fig. 8. Fig. 10 is a top plan view of another form of casing. Fig. 11 is a vertical sectional view of the casing in position taken on the line 11 11 of Fig. 10. Fig. 12 is a detail perspective view of one of the slabs employed in constructing the casings shown in Figs. 10 and 11. Fig. 13 is a similar view of another of the slabs employed in the construction of the same casing. Fig. 14 is a vertical sectional view of a still further modified form of casing. Figs. 15 and 16 are detail perspective views of the sections employed in constructing such a casing. Fig. 17 is a view similar to Fig. 14, illustrating a slightly-modified construction of the casing shown in Fig. 14; and Fig. 18 is a detail perspective view of the casing employed in constructing a well as shown in Fig. 17.

In all the several figures of drawings above referred to the same principle is involved— viz., ease and economy in sinking the casing in the earth to the water-bed and simple and efficient means for causing the water to percolate into the well, cistern, or reservoir without carrying with it sand, sediment, and the like.

Referring to Figs. 1 to 3 of the drawings, the casing is constructed as follows: A series of holes is bored vertically in the earth to a sufficient depth to reach the natural water-bed, and as the holes are successively bored piles 1, which are preferably molded from concrete, are sunk into the holes, the piles preferably being of such length that when placed in position they will project a short distance above the level of the earth. In boring the holes they are bored in an endless series and contiguous to each other in such a manner that when the piles are sunk therein the piles will form an endless wall. In the figures of the drawings referred to the piles are shown as being trapezoidal in cross-section and are arranged in an annular series to form a substantially cylindrical casing. The lower ends of the piles, which when in place are designed to rest upon the sand and gravel, are each provided with one or more transverse inclined or diagonal perforations 2, the piles being sunk in the earth in such manner that the said diagonal perforations extend diagonally upward from the outer sides of the casing toward the interior thereof. As before stated, the piles are somewhat longer than the holes which are driven to receive them, whereby the upper ends of the piles project a suitable distance above the level of the earth to form a coping, and the upper ends of the piles are coated with cement, as indicated at 3, to form a finished curbing. After the piles have been sunk in the ground in the manner described the earth between the said piles is excavated, and when the water-bed is reached the water, sand, and the like may be pumped out until the entire interior of the casing has been removed substantially to the bottom of the piles. A casing is thus formed which, in the figures of drawings referred to, is substantially cylindrical in shape. The water seeping through the sand and gravel surrounding the lower portion of this casing passes upwardly through the diagonal perforations 2, and owing to the small cross-sectional area of these passages and to the fact that said passages are inclined from the outer side of the casing and upwardly into the interior of the latter the sand, sediment, and the like are prevented from flowing with the water into the interior of the casing.

The arrangement shown in Figs. 1 to 3 is adapted for the construction of either a well for domestic purposes, a cistern, or a reservoir of large extent sufficient for supplying the wants of a town.

In Fig. 4 I have shown a horizontal sectional view of a casing constructed in the same manner as described with reference to Fig. 1, excepting that the casing is rectangular in cross-section and the piles 1$^a$ are square in cross-section and are each provided with one or more diagonal perforations 2 in the manner before described, the arrangement being such that when the piles are sunk edge to edge, as heretofore explained, the diagonal perforations will extend upwardly from the outside of the casing to the interior thereof.

In Fig. 6 is shown a horizontal sectional view of a casing substantially octagonal in cross-section, said casing being constructed of piles square in cross-section, such as shown in Fig. 5 of the drawings, the corners being filled in with piles 1$^b$, triangular in cross-section, as shown in Fig. 7, the said square and triangular piles being provided with diagonal apertures 2, arranged in the same manner as described with reference to Figs. 1 and 4 of the drawings.

In Fig. 8 is shown a horizontal sectional view of a casing substantially elliptical in cross-section, and said casing is shown as being constructed of a series of cylindrical piles 1$^c$, each of said piles being provided with diagonal apertures 2 in the manner heretofore set forth. It will be manifest that the piles may be given various different shapes in cross-section and that they may be sunk in the earth to form variously different shaped wells, cisterns, or reservoirs, it only being requisite that the adjacent edges of the piles lie in contact with each other, that they be arranged in an endless series to form an inclosed casing, and that they be so sunk in the earth that the diagonal apertures formed in the bottoms of the piles shall extend in an inclined direction from the exterior of the casing to the interior thereof, and I wish it to be understood that I do not limit myself to the cross-sectional shape of the piles or the shape of the casing formed by the piles after they have been sunk into place.

I do not use the term "pile" herein in its restricted or conventional sense, but as indicating a vertical piece constructed as described and which is adapted to be sunk in a hole previously bored in the ground or in the bed of a lake or stream for the purpose specified.

In Figs. 10 to 13 I have shown a modified method of constructing the casing. The casing is constructed of a series of rectangular slabs or tiles formed of molded concrete. In sinking such a casing an excavation of the size and shape desired is first made in the earth, and what is designed to be the lowermost section is set up in position around the edge of the excavation. Such section numbered 4 (see Fig. 11) is composed of a number of rectangular slabs 5 of concrete, (see Fig. 12,) which are arranged end to end to form the parallel walls 6, (see Fig. 10,) and a series of slabs 7 are also arranged end to end in the form of arches between the ends of the side series of slabs 6 6. Transverse beams or braces 8 are firmly secured between the opposite slabs 6 6 to hold said slabs in position, the arched formation of the slabs 7 preventing the latter from falling inward. The earth is then excavated from between and from under the section thus formed, permitting such section to sink in the ground, the excavation being made deep enough to at least permit said section to sink a depth equal to its own height. Another section 9 is superposed upon the section 4. The section 9 is constructed in the same manner as the section 4 before referred to, and the earth is again excavated from between and underneath the section 4, permitting the sections 4 and 9 to again sink when another section 9 is superposed upon the section 9 first mentioned, after which the earth is again excavated from between and underneath the section 4. This operation is repeated, additional sections being superposed one upon another and the excavations being successively made until the lowermost section 4 has reached the water-bed, upon which the water, sand, and the like is pumped out. The uppermost section 10 projects a suitable distance above the level of the ground and is provided with a curbing of cement in the manner before described. The slabs comprising the tier 4 are perforated, as at 2$^a$, said perforations extending diagonally upward from the outer sides of the slabs to the inner sides thereof. The casing constructed as thus described is a vertical one comprising a series of horizontal sections, each section consisting of an endless series of slabs set and braced in position in the manner set forth. The lowermost section 4 constitutes a casing, and the water flowing or seeping through the perforations 2$^a$ in an upward direction in the manner described the sand, sediment, and the like are prevented from flowing into the said chamber. The same principle of construction is involved in making the casing shown in Figs. 14 to 16 of the drawings. As shown in said figures, the casing consists of a series of tubular or cylindrical sections superposed one upon the other and sunk into the earth, the lowermost section forming the casing. The excavation is first formed in the surface of the earth to receive the lowermost section 11, after which the earth is excavated from beneath said section, permitting it to drop down a distance at least equal to its own height. After this has been done a similar section 12 is superposed upon the section 11, and the earth is again excavated from beneath the section 11, permitting it again to drop, whereupon a third section 12 is superposed upon the second section 12 first mentioned. This operation is repeated, section after section being superposed one upon the other and the earth being successively excavated from beneath the lowermost section 11 until the latter has reached its seat on the water-bed. The last section should project above the ground, as shown in Fig. 14, and the upper end of said section should be coated with cement in the manner before described. Each of the sections 12 consists of an imperforate or cylindrical casing molded from concrete, and the section 11 is similar in construction to the sections 12, except that said section is provided with a plurality of upwardly and inwardly inclined or diagonal perforations 2$^b$. The section 11 forms the filtering-chamber, the sections 12 merely constituting the curbing. The water seeps or flows through the diagonal perforations 2$^b$ in the manner heretofore described, leaving the sand, sediment, and the like on the exterior of the casing, and permitting only the clear water to enter the latter.

Instead of making the casing in a series of sections, in the manner described with reference to Figs. 14 to 16, such casing may consist of a single tubular section of concrete, as indicated at 14, (see Fig. 18,) said section consisting of a molded concrete pipe of any desired length and provided at its lower end with a plurality of perforations 2$^c$, which are inclined upwardly from the exterior to the interior of said tube. A hole of a desired size is bored in the earth and the tubular section is dropped into place. Said tubular section should be of such length that its upper end will project a short distance above the ground, as shown in Fig. 17, the upper end of the said tube being provided with a cement curbing, as heretofore explained. The operation of this form of the casing is precisely the same as that described with reference to Fig. 14.

In all the foregoing examples of my invention the same general principle is involved. In each example illustrated the casing is adapted to be sunk into the earth, the lowermost end of the casing or slab, which rests on the sand and gravel of the natural water-bed, being provided with a plurality of upwardly and inwardly inclined perforations of relatively small area, whereby the water is allowed to seep or percolate in the lower end only of the casing, whereby the sediment, mud, and other objectionable matter are prevented from flowing into the casing with the water. The water may be pumped or raised from the well, cistern, or reservoir in any usual well-known or preferred manner, this forming no part of my invention.

As has been heretofore stated, the well, cistern, or reservoir constructed in either of the manners before described may be sunk in the bottom of a stream or lake or the like, it only being necessary to proceed in the manner before described and to then pump out the alluvial soil from the bottom. When arranged in this manner, the bottom of the well, cistern, or reservoir will be beneath the natural bed of the watercourse and none of the surface water from such stream or lake can possibly seep through into the casing, the water entering thereinto being taken from beneath the natural bed or bottom of the watercourse or lake.

Having described my invention, what I claim is—

1. In a casing of the class described, sunk in the earth to the natural water-bed and comprising a vertical casing imperforate from its top to near its bottom, said casing being provided at its lower end with a plurality of upwardly and inwardly inclined perforations, substantially as described.

2. In a casing of the class described, sunk in the earth to the natural water-bed and comprising a vertical casing imperforate from its top to near its bottom, said casing being provided at its lower end with a plurality of upwardly and inwardly inclined transverse perforations, said perforations being of relatively small area in cross-section, substantially as and for the purpose specified.

3. In a casing of the class described, a plurality of piles sunk vertically in the earth in an endless series to form an inclosed chamber, said piles being provided at their lower ends with transverse perforations inclined upwardly from the outer to the inner sides of the piles, substantially as and for the purpose specified.

4. In a casing of the class described, a plurality of concrete piles sunk vertically in the earth in an endless series to form an inclosed chamber, said piles being provided at their lower ends with transverse perforations inclined upwardly from the outer to the inner sides of the piles, substantially as and for the purpose specified.

5. In a casing of the class described, a plurality of concrete piles sunk vertically in the earth in an endless series to form an inclosed chamber, said piles being arranged edge to edge in close contact and provided at their lower ends with transverse perforations inclined upwardly from the outer to the inner sides of the piles, substantially as and for the purpose specified.

In testimony whereof I have hereunto set my hand in presence of two subscribing witnesses.

JOHN W. BEAUMONT.

Witnesses:
GEO. W. REA,
VINTON COOMBS.